J. A. FERGUSON.
SAW SET.
APPLICATION FILED JUNE 20, 1916.
1,221,040.
Patented Apr. 3, 1917.
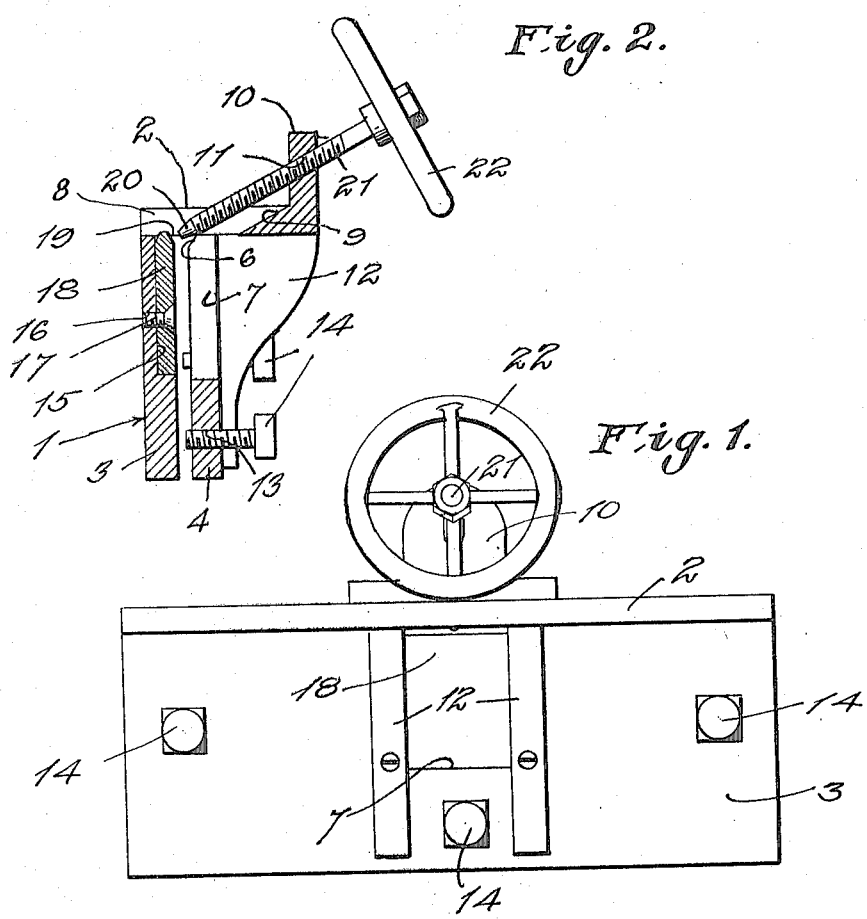
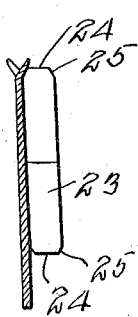
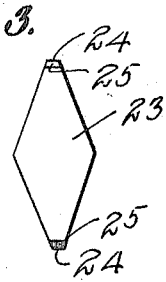
Witnesses
H. H. Keith
Inventor
J. A. Ferguson.
By
Attorney

UNITED STATES PATENT OFFICE.

JAMES A. FERGUSON, OF PLUMMER, IDAHO.

SAW-SET.

1,221,040.	Specification of Letters Patent.	Patented Apr. 3, 1917.

Application filed June 20, 1916. Serial No. 104,702.

*To all whom it may concern:*

Be it known that I, JAMES A. FERGUSON, a citizen of the United States, residing at Plummer, in the county of Benewah and State of Idaho, have invented certain new and useful Improvements in Saw-Sets; and I do hereby declare the following to be a full, clear, and exact description of the invention, such as will enable others skilled in the art to which it appertains to make and use the same.

This invention relates to new and useful improvements in saw sets, and the principal object of the invention is to provide a saw set which will effectively set the teeth of saws of all kinds without danger of injuring the same.

Another object of the invention is to provide a simple and efficient saw set which may be easily and cheaply constructed and which is so constructed that it will hold the saws being set firmly in place and against accidental movement.

A still further object of the invention is to provide a saw gage for use in connection with the set to indicate to the operator whether the teeth are at the proper angle or not.

With these and other objects in view, the invention consists in the novel combination and arrangement of parts which will be fully set forth in the following specification and accompanying drawing, in which:—

Figure 1 is a side view in elevation of a saw set constructed in accordance with this invention.

Fig. 2 is a vertical sectional view through the center of Fig. 1.

Fig. 3 is a side view in elevation of the gage, and

Fig. 4 is an edge view of the gage showing the same in use on a saw.

Referring to the drawing the numeral 1 designates as an entirety the frame of the device comprising the top plate 2 having secured adjacent one edge the right angularly extending side plates 3. A parallel side plate 4 is secured to the top plate in close proximity to the plate 4 and these plates 3 and 4 form guide-ways into which the saw slides. The upper edges of these plates are inclined as at 6 near the point where they join the plate 2 to accommodate the teeth of the saw after the same have been set. Formed centrally of the plate 4 and extending downwardly from its upper edge for a short distance is the enlarged rectangular recess 7 which alines with the recess 8 formed in the top plate which extends from a point near its forward edge entirely to the rear edge of said plate. The end wall 9 of the recess 8 is inclined as clearly shown in Fig. 2 and extending upwardly from the connecting portion of said plate is the ear 10 provided with its downwardly and inwardly inclined internally threaded recess 11 the use of which will appear as the description proceeds. Suitable brackets 12 are connected to the plate 4 and to the under side of the plate 2 to hold said plates in proper position.

Formed in the plate 4 is a plurality of internally threaded openings 13 for the reception of the set screws 14 by means of which the saws which are placed in the device are clamped.

The wall or plate 3 is formed near the upper edge of its inner face with a recess 15 the side walls of which aline with the walls of the openings 7 and 8 and a suitable internally threaded opening 16 is formed centrally of the recess 15. This opening 16 is adapted for the reception of the screw 17 by means of which the anvil 18 is attached in place. This anvil is provided adjacent its upper edge with the inclined faces 19 which are arranged to limit the lateral movement of the saw teeth. This anvil coöperates with the tapered end 20 of the pressure screw 21 which is threaded through the opening 11 and provided at its opposite end with the hand wheel 22 by means of which it is rotated.

Passing now to the description of the gage reference will be had particularly to Figs. 3 and 4 in which the gage is designated by the numeral 23 and comprised of a substantially diamond shaped body having its ends squared as at 24 and provided adjacent the squared ends with the beveled faces 25. The incline of these faces is such that when the proper set of the saw tooth is made the face of the body 23 will lie against the saw while the inclined face 25 will lie against the tooth, as clearly shown in Fig. 4. As shown in Fig. 3 it will be seen that the opposite ends of the body 23 are so shaped as to fit saw teeth of varying sizes thus enabling the gage to be properly used on all types of saws.

In use it will be seen that a saw is passed through the face between the guide plates 3 and 4 and the tooth to be set is in a line with the tapered end 20 of the pressure screw 21 whereupon the hand wheel 22 is rotated thus causing the tapered end of the pressure screw to move toward the anvil 18 and cause the saw tooth to bend in that direction. After the teeth have been set the gage is used as shown in Fig. 4 and it will thus be seen that the proper set of the teeth is insured.

While in the foregoing there has been shown and described the preferred embodiment of this invention, it is to be understood that such changes may be made in the combination and arrangement of parts as will fall within the spirit and scope of the appended claim.

What is claimed is:—

A saw set comprising a plate, a downwardly extending guide plate at one edge of the first mentioned plate, a second guide plate extending downwardly from the first mentioned plate in parallel relation with the first mentioned guide plate, both guide plates being provided with inclined portions adjacent their upper edges, the rearmost guide plate having a recess formed therein, an anvil seated in the recess, the forward guide plate being provided with a recess extending downwardly from its upper edge and positioned in alinement with the recess in the rear guide plate, set screws carried by the front guide plate, an upwardly extending ear at the forward edge of the first mentioned plate, said ear being provided with a downwardly and rearwardly inclined threaded opening, a pressure screw extending through said opening and adapted to coöperate with the anvil in bending saw teeth and a hand wheel for rotating said pressure screw.

In testimony whereof I affix my signature in presence of two witnesses.

JAMES A. FERGUSON.

Witnesses:
 R. H. MERCER,
 M. McDONALD.

Copies of this patent may be obtained for five cents each, by addressing the "Commissioner of Patents, Washington, D. C."